US008456296B2

(12) United States Patent
Piltonen et al.

(10) Patent No.: US 8,456,296 B2
(45) Date of Patent: Jun. 4, 2013

(54) ASSISTED DIRECTION FINDING APPARATUS (75) Inventors: Harri Piltonen, Oulunsalo (FI); Mikko Tuunanen, Oulunsalo (FI)

(73) Assignee: Radio Systems Corporation, Knoxville, TN (US)

( * ) Notice: Subject to any disclaimer, the term of this patent is extended or adjusted under 35 U.S.C. 154(b) by 606 days.

(21) Appl. No.: 12/508,993

(22) Filed: Jul. 24, 2009

(65) Prior Publication Data

US 2011/0018708 A1    Jan. 27, 2011

(51) Int. Cl.
*G08B 1/08*    (2006.01)
(52) U.S. Cl.
USPC .............. 340/539.13; 340/8.1; 340/932.2; 340/995.1; 342/357.31; 342/357.75
(58) Field of Classification Search
USPC ... 340/539.13, 8.1, 932.2, 995.1; 342/357.31, 342/357.75
See application file for complete search history.

(56) References Cited

U.S. PATENT DOCUMENTS

| 6,496,008 | B1 | 12/2002 | Brune et al. |
| 7,068,163 | B2* | 6/2006 | Sari et al. ............... 340/539.13 |
| 2005/0270234 | A1 | 12/2005 | Wolf et al. |
| 2009/0009398 | A1 | 1/2009 | Taylor et al. |

FOREIGN PATENT DOCUMENTS

| CA | 2218184 | 4/1999 |
| EP | 1439400 | 7/2004 |
| WO | 9008060 | 7/1990 |
| WO | 2008112765 | 9/2008 |

* cited by examiner

*Primary Examiner* — Daryl Pope
(74) *Attorney, Agent, or Firm* — Pitts & Lake, PC

(57) ABSTRACT

The invention relates to a method for measuring and indicating a true direction of a tracked object. The invention also relates to an apparatus and a tracking system utilizing the method. The invention also relates to a direction determination circuitry and to a computer readable storage medium comprising computer readable code, which is utilized in the direction determination circuitry. In the method a radio-bearing device shows all the time on a display true directions wherefrom a radio-bearing have been taken. The direction of the maximum signal strength measurement is highlighted on the display.

23 Claims, 7 Drawing Sheets

ASSISTED DIRECTION FINDING APPARATUS

TECHNICAL FIELD

The invention relates to a method for tracking and displaying a geographic direction of a target carrying a radio transmitter. The invention also relates to an apparatus utilizing the tracking method. The invention also relates to a tracking circuitry utilized in the apparatus. The invention also relates to tracking system comprising a transmitter of an object to be tracked and a directional receiver of a tracker. The invention also relates to a computer readable medium comprising a computer readable code which is utilized for implementing the method.

BACKGROUND

Figure 1A:
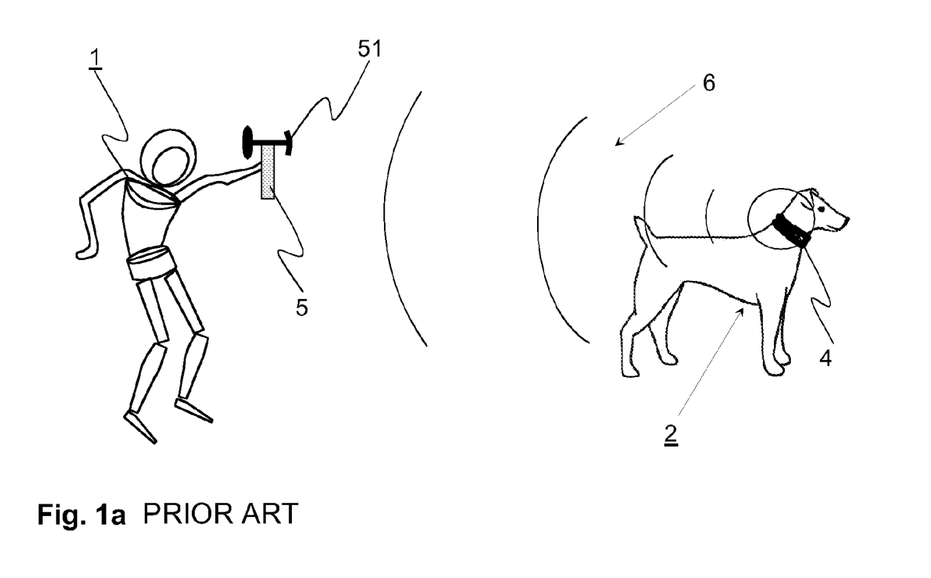
FIG. 1a shows a known tracking arrangement.

Portable, hand-held radio tracking receivers are commonly utilized in tracking systems of different kinds. FIG. 1a depicts one example of a tracking system known in the art. In the depicted tracking system, a target 2, in this example a dog, to be tracked carries a radio transmitter 4. The radio transmitter comprises an omnidirectional antenna that sends radio signals 6. The radio transmitter 4 may transmit periodically to save limited battery power of the radio transmitter 4. The transmitter may for example transmit a short radio pulse once in a second. The depicted exemplary tracking system also comprises a directional radio receiver 5 of the tracker 1. The receiver 5 is sometimes also called a radio-bearing device. The tracker 1 uses the radio-bearing device 5 to determine from which direction the radio signals 6 are coming. After determination it is known in which direction the target 2 is. Radio tracking systems are used, among other things, in the positioning of pets and hunting animals.

The ability of a radio-bearing device 5 to determine the incoming direction of the radio signal 6, i.e. take a bearing, is based on a directional antenna 51 of the radio-bearing device 5. A directional antenna 51 has the basic property that it receives radio signals well when a beam of the antenna 51 is directed straight towards the radio transmitter 4 sending radio signals 6. The directional antenna 51 attenuates considerably radio signals coming from other directions. The mechanical structure and dimensions of the directional antenna 51 depend on the used radio frequency. The antenna used in the mobile tracking receivers on the market today is generally a so-called Yagi antenna with 2 or 3 antenna elements. A directional antenna may be integrated into the same body with the radio-bearing device 5 in order to create an easy-to-use and small-sized hand-held radio-tracking receiver.

Figure 1B:
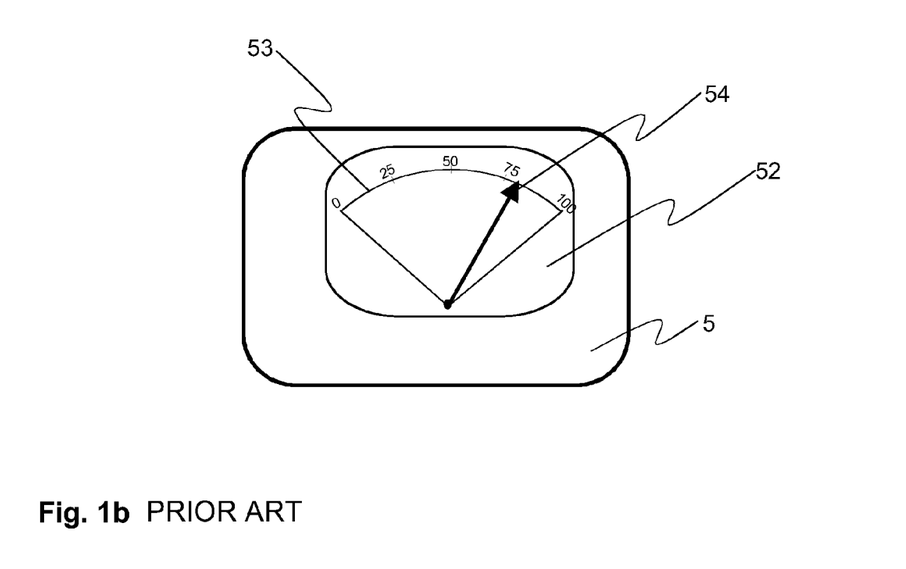
FIG. 1b shows an exemplary display unit of a radio-bearing device.

FIG. 1b depicts an example of an exemplary visual display unit 52 of a bearing-device 5. The depicted display unit 52 is in the example an integral part of the radio-bearing device 5 (which has not been shown completely in FIG. 1b). The exemplary display unit 52 includes a scale 53 that can be used to show received signal level or strength. In the depicted example, a pointer 54 shows on the scale 53 how strong the received signal is. In the example of FIG. 1b reading "0" on the scale 53 represents a situation where a received signal level is very low or not existing at all. On the other hand, reading "100" on the scale 53 represents a situation where a very strong received signal saturates the receiver circuit of the radio-bearing device 5. In the depicted example of FIG. 1b, the pointer 54 shows that the radio-bearing device 5 has received quite a strong signal from a direction whereto the antenna of the bearing device is directed.

When the tracker 1 turns the radio-bearing device 5 in a way where the antenna beam of the radio-bearing device 5 changes its direction, the reading 54 on the scale 53 of the display unit 52 changes. Depending on if the antenna of the radio-bearing device 5 is turned towards the transmitter device 4 or away from the transmitter device 4, the reading on the scale 53 of the display unit 52 either increases or decreases. The tracker 1 tries to find a maximum reading on the display unit 52 by turning the radio-bearing device 5 to different directions. However, when finding the direction of the maximum transmission, the tracker 1 has to remember the detected direction of the tracked target 2. If the radio-bearing device 5 is turned away from the direction of the transmitter 4 of the target 2, the reading on the display unit 52 decreases. Therefore, the tracker 1 has to remember all the time wherefrom the maximum reading has been measured.

SUMMARY OF SOME EXAMPLES OF THE INVENTION

In one aspect, an embodiment of the invention comprises a method comprising:
  turning of a radio-bearing device in the horizontal plane;
  determining after a turn an angle of magnitude of the turn and a geographic direction of the radio-bearing device;
  determining if a signal has been received from the determined geographic direction;
  determining the received signal strength;
  saving the received signal strength with the determined geographic direction;
  determining a maximum received signal strength from all measured signals strengths; and
  showing the determined geographic directions and a geographic direction of the maximum received signal strength on a display of the radio-bearing device in their true directions.

One embodiment of the invention comprises an apparatus comprising:
  a receiver with a signal strength detector;
  an electronic compass configured to determine and indicate a geographic direction;
  a display unit;
  a processor; and
  a memory including computer program code;
  the memory and the computer program code configured to, with the processor, cause the apparatus at least to:
    determine a direction and an angle of magnitude of a turn and a geographic direction of the apparatus in the horizontal plane;
    determine a signal strength received from the determined geographic direction;
    save the determined signal strength with the determined geographic direction;
    determine a maximum received signal strength from all received signal strengths; and
    show the determined geographic directions and a geographic direction of the maximum received signal strength on the display of the apparatus in their true directions.

One embodiment of the invention comprises a direction determination circuitry configured to:
  determine a turn in the horizontal plane;
  determine a direction and an angle of magnitude of the turn;
  determine and indicate after the turn a geographic direction;

determine a signal strength received from the indicated geographic direction;

save the determined signal strength measurement with the indicated geographic direction;

determine a maximum received signal strength from all determined signal strength measurements; and show the determined geographic directions and highlight a geographic direction of the maximum determined signal strength on a display in their true directions.

One embodiment of the invention comprises a tracking system comprising:

a transmitter carried by an object to be tracked; and a directional receiver comprising:

a means for determining and indicating a geographic direction;

a means for determining a received signal strength;

a means for showing all geographic directions wherefrom signals have been determined; and a means for showing the determined geographic directions and highlighting a geographic direction of a maximum received signal strength on a display of the directional receiver in their true directions.

One embodiment of the invention comprises a computer readable storage medium having computer-executable components comprising:

computer readable code for determining a direction and an angle of magnitude of the turn of an apparatus in the horizontal plane;

computer readable code for determining after the turn a geographic direction of the apparatus;

computer readable code for determining a signal strength received from the determined geographic direction;

computer readable code for saving the received signal strength and determined geographic direction;

computer readable code for determining a maximum received signal strength from all received signals; and computer readable code for showing the determined geographic directions and a geographic direction of the maximum received signal strength on a display of an apparatus in their true directions.

Some advantageous embodiments of the invention are disclosed in the dependent claims.

Further scope of applicability of the present invention will become apparent from the detailed description given hereafter. However, it should be understood that the detailed description and specific examples, while indicating advantageous embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and accompanying drawings which are given by way of illustration only, and thus are not restrictive of the present invention, and wherein.

DETAILED DESCRIPTION OF THE DRAWINGS

FIGS. 1a and 1b were discussed in conjunction with background section.

In the following description, considered embodiments are merely exemplary, and one skilled in the art may find other ways to implement the invention. Although the specification may refer to "an", "one"; or "some" embodiment(s) in several locations, this does not necessarily mean that each such reference is made to the same embodiment(s), or that the feature only applies to a single embodiment or all embodiments. Single features of different embodiments may also be combined to provide other embodiments.

Figure 2:
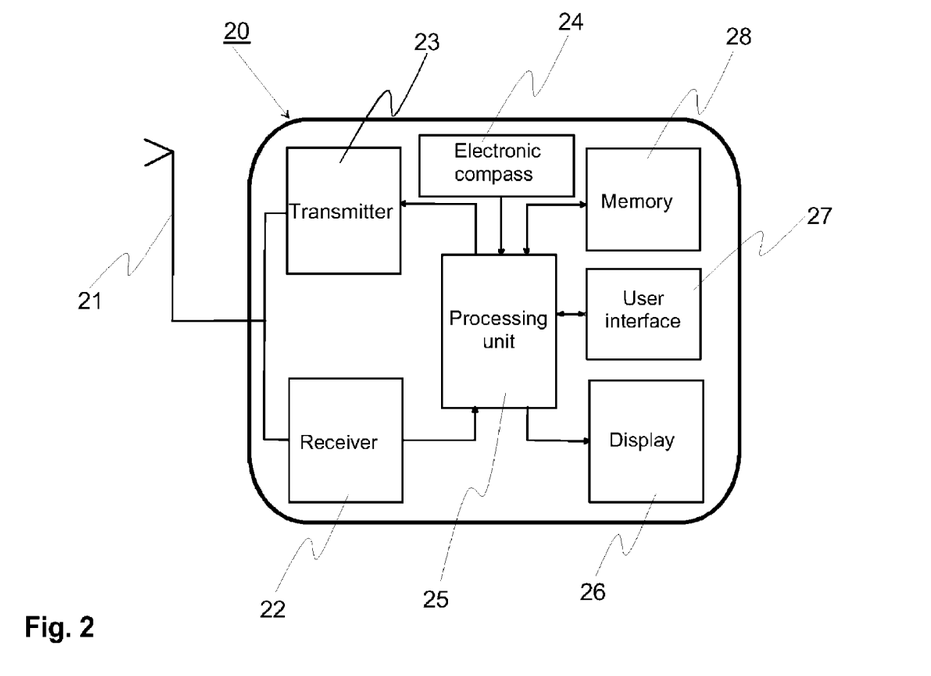
FIG. 2 shows an exemplary radio-bearing device of an embodiment of the invention.

In FIG. 2 is depicted an exemplary apparatus which comprises some advantageous features of the invention. The depicted exemplary embodiment is a radio-bearing device 20. The depicted radio-bearing device 20 uses an antenna 21 in reception of signals from the transmitter 4 of the object 2 to be tracked. The transmitter 4 of the target is advantageously an omnidirectional transmitter. The antenna 21 is advantageously a directional antenna. In one advantageous embodiment the 3 dB beam width of the antenna 21 is about 30 degrees. A front-to-back ratio of the antenna 21 is advantageously 6 dB.

The radio-bearing device 20 comprises an RF receiver 22 (Radio Frequency). The RF receiver 22 comprises some known prior art receiver means for all messages or signals to be received from the transmitter 4. The RF receiver 22 comprises advantageously an analog amplifier, analog or digital filter, a signal level detector and an A/D converter. The output signals of the RF receiver 22 may be in digital form and they can be conveyed as such to the processing unit 25 of the radio-bearing device 20. The receiver 22 may also comprise a display unit which is capable of showing the output of the signal level detector. The display unit may be an analog display indicator or a digital display indicator known in the art.

The radio-bearing device 20 may optionally also comprise an RF transmitter 23. The RF transmitter may be utilized for sending commands to the transmitter 4 of the target. The commands may comprise for example start or stop transmission commands or some other commands necessary in a tracking situation.

The exemplary radio-bearing device 20 advantageously comprises an electronic compass 24. An electronic compass is an electromagnetic component that employs two or more highly permeable magnetic material particles for sensing the direction of the horizontal component of the earth's magnetic field. The reading of the electronic compass 24 is in electronic form and can be digitized. The electronic compass 24 may be for example a so-called fluxgate compass or equivalent.

The radio-bearing device 20 advantageously comprises a user interface 27. It comprises advantageously at least one key either for controlling the radio-bearing device 20 or for sending commands to the radio transmitter 4 of the target 2.

The radio-bearing device 20 advantageously comprises at least one display unit 26 for showing results during or after the radio-bearing process. The display unit 26 may be for example an LCD display, OLED display or LED display. However, a man skilled in the art may utilize also other known display types.

The display unit 26 of the radio-bearing device 20 is capable of showing all detected signal strength measurement directions which have been successfully got by the receiver 22 when the radio-bearing device 20 has been turned in horizontal plane in one direction. The detected signal strength measurement directions, which have been successfully got, are all the time oriented on the display 52 so that they indicate the true geographic direction wherefrom each one were measured, i.e. a turn of the radio-bearing device 20 in one direction causes the direction measurement information on the display unit 26 to turn to the opposite direction correspondingly. On the display 26 received signal level measurements are shown according to the detected signal strengths. When a stronger signal has been measured from a particular direction, that direction is advantageously highlighted on the display. At least after a turn of full 360 degrees a geographic direction, which has indicated the maximum received signal strength, is clearly indicated on the display 26.

The display unit 26 may also comprise a means for showing a current reading of the electronic compass 24 during or after the tracking process.

A processor unit 25 controls the operation of the radio-bearing device 20. The processor unit 25 may be implemented by a processor, which may comprise but is not limited to one microprocessor. It may also comprise at least one processor with an accompanying digital signal processor or one or more special-purpose computer chips, one or more field-programmable gate arrays (FPGA), one or more controllers and one or more application-specific integrated circuits (ASICS).

The radio-bearing device 20 may also comprise advantageously one or more internal and/or external memories 28 (e.g., ROM, RAM, FLASH, USB, CD-ROM, etc.). The memory 28 is advantageously capable of saving computer program code, which is utilized in the bearing taking process according to the embodiments of the invention. Also measurement results from the electronic compass and signal strength measurement may be saved in the memory 28. Display drivers needed to show tracking results on the display 26 may also be saved in the memory 28.

The processor unit 25 advantageously accomplishes process steps of a bearing-taking by executing proper computer program code instructions according to the embodiments of the invention. In said execution of the bearing-taking process the processor unit 25 utilizes advantageously computer program code instructions saved in the memory 28. The processor unit 25 also reads continuously or one after the other the output of the electronic compass 24 and the output of the signal strength indicator of the RF receiver 22. The processor unit 25 associates to one data unit a measured geographic direction from the electronic compass 24 and corresponding signal strength or level measurement result from the RF receiver 22. The associated data unit is advantageously saved in the memory 28 and in parallel it is advantageously displayed on the display unit 26 of the radio-bearing device 20.

One technical effect of the invention is that an individual result of a signal strength measurement is always associated to an individual geographic direction. Therefore, the radio-bearing device 20 is capable of showing during the radio-bearing process all geographic directions wherefrom a signal strength measurement result has been got. The radio bearing-device 20 may also advantageously indicate directions wherefrom a signal strength measurement has not been got.

The radio-bearing device 20 is at least after a turn of 360 degrees configured to show on the display 26 a direction of the maximum detected signal strength by a proper direction indicator. The direction indicator is advantageously highlighted in a proper manner. One advantageous technical effect of the invention is that the geographic direction of the measured maximum signal strength is all the time visible on the display 26, although the antenna of the radio-bearing device is not directed against the radio transmitter 4 of the target 2.

In a case where the radio-bearing device 20 is turned to one direction after completing the radio-bearing, the direction indicator on the display 26 also turns correspondingly to the opposite direction on the display 26. Therefore, a turn of the radio-bearing device 20 does not affect the direction whereto the direction indicator is showing. This feature has the technical effect that the direction of the target 2 is after the radio-bearing process always shown on the display regardless of the orientation of the radio-bearing device 20.

In a case where from at least one direction no measurement result at all has been got, the tracker 1 can turn the radio-bearing device 20 back to that direction and measure that direction once again. This direction measurement result is advantageously added to the original direction measurement results. By doing so the direction indicator on the display may advantageously become narrower compared to the original measurement result. This has the technical effect that the direction of the target 2 can be estimated more accurately.

An embodiment of the invention is accomplished by utilizing a circuitry comprising at least the processing unit 25 and memory 28 and proper software saved in the memory.

As used in this application, the term 'circuitry' refers to all of the following: hardware-only circuit implementations (i.e. implementations in only analog and/or digital circuitry) and combinations of circuits and software, such as a combination of a processor, software and memory that work together to cause an apparatus, such as radio-bearing device, to show signal strength measurement results of 360 degrees irrespective of the horizontal direction of the apparatus. This definition of 'circuitry' applies to all uses of this term in this application, including claims.

Figure 3A:
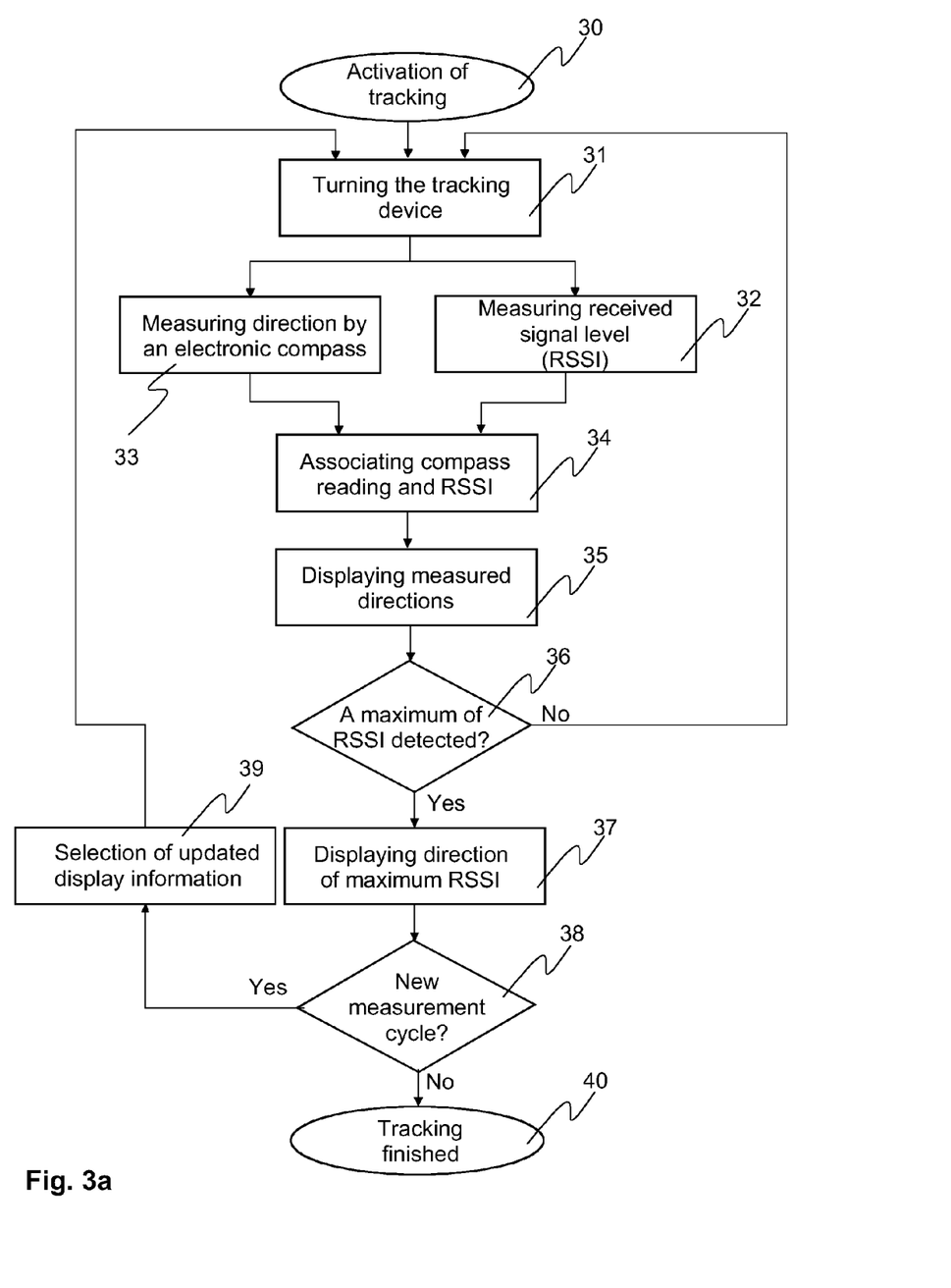
FIG. 3a shows as an exemplary a flow chart including main stages of the method according to an embodiment of the invention.
Figure 3B:
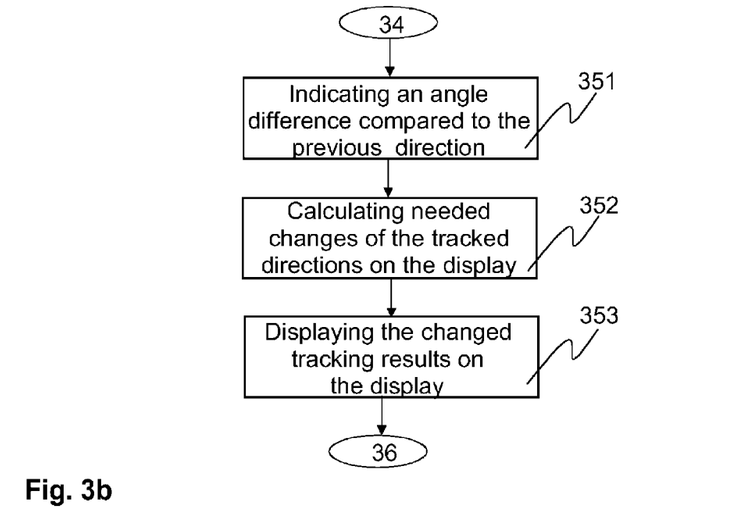
FIG. 3b shows as an exemplary a flow chart how a display of the tracking apparatus may be changed in one exemplary embodiment.

FIGS. 3a and 3b depict as an exemplary flow chart steps of a method utilized in tracking an object.

In step 30, the radio-bearing device 20 according to an embodiment of the invention is activated. Advantageously in this step, the radio-bearing device 20 is turned on. This means that the RF receiver 22, processing unit 25, memory 28, display 26 and electronic compass 24 are functioning.

In one advantageous embodiment of the invention, the radio-bearing device 20 is capable of sending "start transmission" instruction to the transmitter 4 of the target 2. The transmitter 4 of the target 2 starts transmitting after the received starting instruction. Advantageously the transmitter 4 transmits RF signals periodically. A time period utilized may be substantially about one second between two consecutive RF transmissions. Advantageously the radio-bearing device 20 makes also geographic direction and signal strength measurements utilizing the same time period.

In the end of step 30 the radio-bearing device 20 is capable of starting the tracking of the RF signals transmitted by the transmitter 4. The first received signal strength (RSSI) measurement result is advantageously made in the geographic direction whereto the radio-bearing device is directed at the activating moment. The measurement result, comprising a geographic direction and measured signal strength, is advantageously saved in the memory of the radio-bearing device 20.

In step 31, the radio-bearing device 20 is turned from the original geographic direction of the starting direction in the horizontal plane. Advantageously a turning angle of the radio-bearing device 20 is substantially equal to the beam width of the antenna 21. In that case, a signal strength measurement may be accomplished from a direction wherefrom signals were attenuated in the signal strength measurement of the starting direction.

Steps 32 and 33 are performed substantially in parallel after a predefined time period from the previous measurement time. The steps 32 and 33 may be accomplished in any order. In step 33 a reading of the electronic compass 24 is read and saved. In step 32 a signal strength level measurement (RSSI) is accomplished in the RF receiver 22. Also the RSSI measurement result is saved in the memory 28.

In step 34 the received signal strength measurement result and the reading of the electronic compass are associated. The association of the measurement results is advantageously saved in the memory 28.

In step 35 all directions which have until then been measured are shown on the display 26 in their true directions. Advantageously directions wherefrom a signal strength measurement result has been got are differentiated from directions from which the signal strength measurement has not been successful. The measured directions on the display 26 are always shown so that a particular measurement result points to the true geographic direction wherefrom it was measured. This means that the posture of the radio-bearing device 20 in the horizontal plane does not have an effect on the shown measurement directions.

FIG. 3b depicts one exemplary embodiment how measurement results can be displayed. In step 351 an angle between two consecutive compass readings is indicated. Also the direction of the change of the compass reading is indicated.

In step 352 it is calculated how the detected angle difference affects the earlier measurement results shown on the display. Advantageously the earlier shown measurement results will be turned on the display to other direction than the indicated direction of the angle change. The earlier measurement results are turned by the amount which is equal to the indicated angle difference between the two consecutive compass readings.

In step 353 the measurement results after the turn are shown on the display in the calculated new position. In the new position all measured directions on the display point to their true geographic directions.

The turn of the radio-bearing device 20 may be accomplished either stepwise or continuously. In step 36 it is tested if a maximum reading of the RSSI measurement has been detected. If a maximum is not detected, the radio-bearing device 20 may be turned further to the same direction as earlier. In that case the process returns to step 31 and after that in steps 32 and 33 new compass readings and RSSI measurements are accomplished. If a maximum RSSI reading is detected, it may be shown highlighted on the display in step 37.

In an advantageous embodiment a full cycle of 360 degrees is attained in the tracking operation. The maximum RSSI reading detected in step 36 is shown on the display 26 of the radio-bearing device 20 in step 37. The direction of the maximum signal strength measurement is advantageously highlighted on the display 26. The direction of the received maximum signal strength on the display 26 points to the actual geographic direction wherefrom it was measured regardless of the posture of the radio-bearing device 20 in the horizontal plane.

The tracker may after step 37 request a new measurement in step 38.

If the tracker 1 does not want to start a new measurement, then the tracking process according to the invention ends in step 40. In one advantageous embodiment of the invention the display 26 retains the measurement results until the tracker 1 resets the display.

In another advantageous embodiment the display 26 resets automatically in step 40 after a predefined delay.

If in step 38 it is decided that a new or a supplementary measurement is needed, then in an optional step 39 the previous measurement results can be deleted either partially or wholly for updating the display information. In both said cases the tracking process returns back to step 31 and a new measurement cycle starts.

A possibility to delete a part of measurement results is advantageous in a case where at least from one direction a signal strength measurement result has not been got. One possibility as to what causes that kind of an error is that the tracker 1 has turned the radio-bearing device 20 too fast. Therefore, an acceptable measurement from one or more geographic directions is lacking. However, also these invalid measurement results are indicated on the display 26 and saved in the memory 28 of the radio-bearing device 20.

In that case the tracker 1 can turn the radio-bearing devise 20 to the direction wherefrom the measurement result is lacking when the tracking process has returned to step 31. When a new measurement result has been got in steps 32, 33 and 34 from said direction, the display 26 is automatically updated with the new measurement in step 35. Advantageously the updated display shows the direction of the target 2 in a way which is more accurate than the direction shown in the non-updated display.

Any of the steps described or illustrated in the flow chart of FIG. 3 may be implemented using executable instructions in a general-purpose or special-purpose processor. The executable instructions may be stored on a computer readable storage medium (e.g., disk, memory, or the like) to be executed by such a processor. References to 'computer readable storage medium' and 'computer' should be understood, in addition to microprocessors known in the art, to encompass specialized circuits such as field-programmable gate arrays, application-specific integrated circuits (ASIC), USB flash drives, signal processing devices, and other devices.

Also intermediate and end results utilized in the depicted method may be stored temporarily or constantly at least to one memory 26 which the processor 25 of the radio-bearing device can utilize. At least one of the following memory types ROM, RAM, FLASH and USB memory may be used to implement the memory 26 of the radio-bearing device.

FIGS. 4a-4g depict examples of views on the display unit 26 of the radio-bearing device 20 during an exemplary direction-finding event. The shape and size of the depicted display unit 26 of the radio-bearing device 20 is only exemplary. The display unit 26 comprises an exemplary screen display 260. In the depicted example the screen display 260 comprises a space between two co-axial circles 260a and 260b. These two circles create a toroid 260 on the display 26. The toroid is utilized in the depicted example as a display mode. However, the invention is not limited to the depicted exemplary screen display type 260.

Also the depicted outlook and placing of the electronic compass 24 is only exemplary. A reading of the electronic compass, i.e. a compass needle 24a, may be shown on the display unit 26 of the radio-bearing device 20. In FIGS. 4a-4g, the compass needle inside the exemplary electronic compass 24 is in each Figure directing to the magnetic North Pole. The exemplary radio-bearing device 20 also comprises an RSSI indicator 22a.

In another embodiment of the invention the RSSI indicator 22a may not be shown in the radio-bearing device 20.

In another embodiment of the invention the reading of the electronic compass 24 is not shown in the radio-bearing device 20.

The transmitter 4 of the target to be tracked is depicted by reference 4.

In the examples 4a-4g the depicted exemplary radio-bearing device 20 also comprises a protrusion, reference A, depicting a directional antenna. It is included in FIGS. 4a-4g only for making it easier to assess the direction of a chassis of the radio-bearing 20 device in the horizontal plane in different situations. In the depicted example, a fictitious North is on the upper side of FIG. 4a. It is also assumed that the tracker 1 stays on the opposite side of the radio-bearing device than the antenna A.

The example of FIGS. 4a-4g depicts advantageously steps 30-40 of a tracking process of the flow chart of FIG. 3.

Figure 4A:
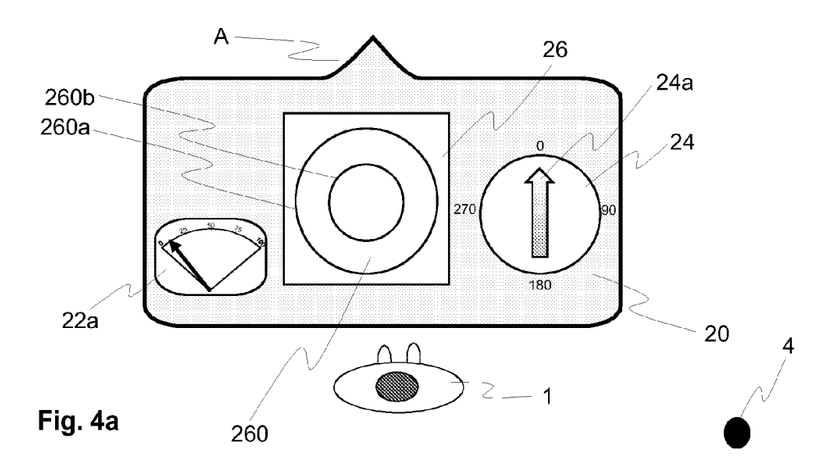
FIGS. 4a-4g show display examples on a display of a radio-bearing device according to an embodiment of the invention.

FIG. 4a depicts a situation where the tracking is activated. In the depicted example the chassis of the radio-bearing device 20 is directed substantially to the North according the electronic compass 24 reading (compass reading "0" degrees"). However, any signal measurement results have not been got because the screen display 260 is empty. Also the RSSI indicator shows a low reading. The situation is comparable to the activation step 30 of FIG. 3.

Figure 4B:
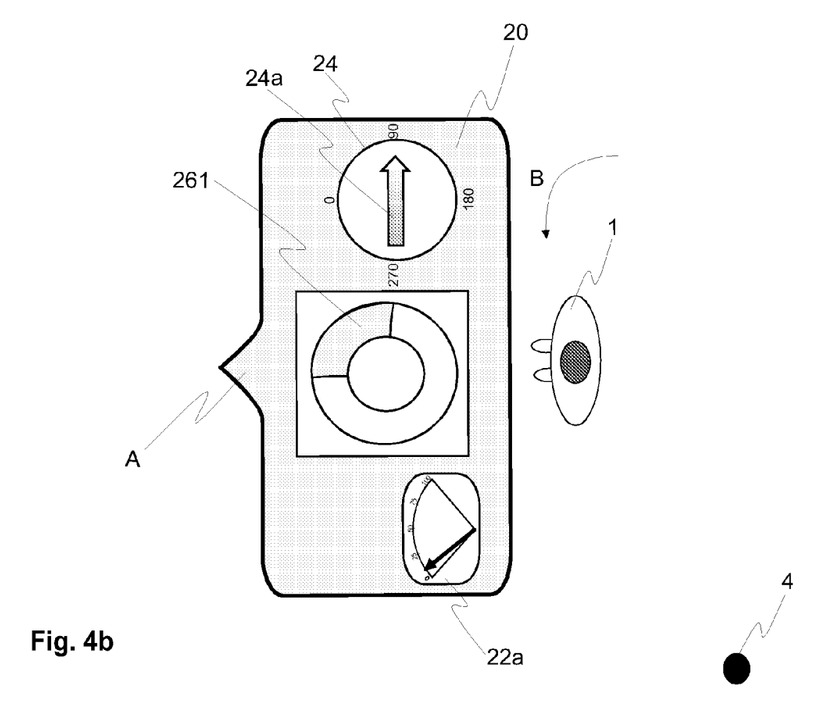

FIG. 4b depicts a situation after at least one turn of the radio-bearing device 20 counter-clockwise to the direction of the arrow B. about 90 degrees. Due to the turn the needle 24a of the electronic compass 24 has changed clockwise to show "90 degrees" direction. During the turn the receiver 22 of the radio-bearing device 20 has succeeded in making at least one signal strength measurement. This is indicated on the screen display 260 by a highlighted area 261. The RSSI indicator still shows a low reading.

Figure 4C:
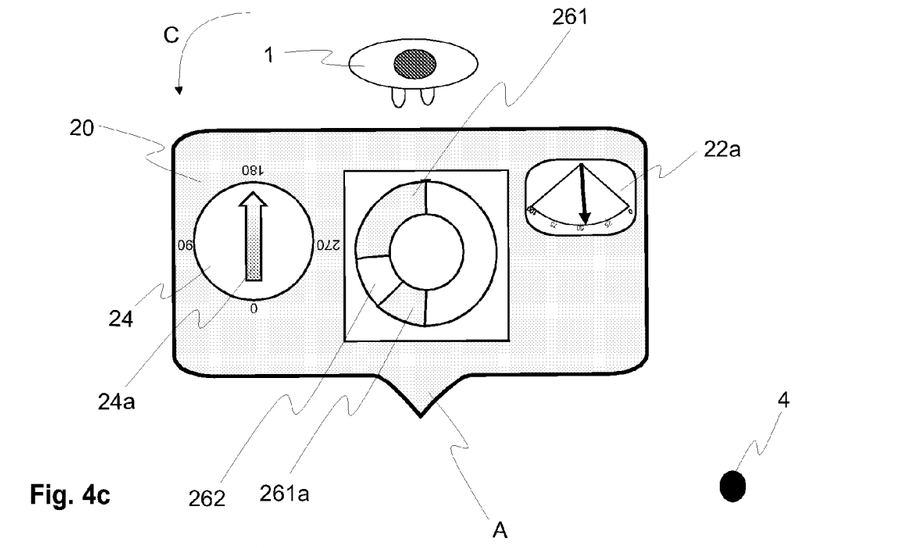

FIG. 4c depicts a situation after the radio-bearing device has been turned a further 90 degrees in the direction of the arrow C. Due to the turn the needle 24a of the electronic compass 24 has changed to show "180 degrees" direction. During the turn the receiver 22 of the radio-bearing device 20 has succeeded in making at least two signal strength measurements. This is indicated on the screen display 260 by highlighted areas 261 and 261a. However, it is also indicated that in one direction, reference 262, the signal strength measurement has not succeeded. This is indicated on the screen display by leaving that portion 262 of the screen display non-highlighted. It is apparent to a man skilled in the art that the unsuccessful measurement direction may be indicated on the display 26 also in some other way. The RSSI indicator still shows quite a high reading because the transmitter 4 of the target is situated in the antenna beam.

Figure 4D:
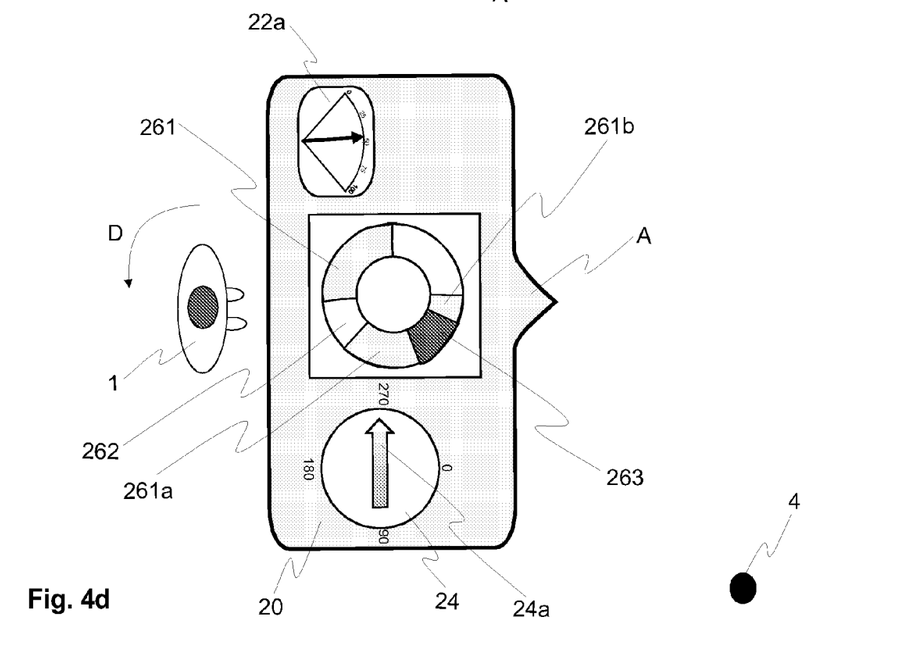

FIG. 4d depicts a situation after the radio-bearing device has been turned still further about 90 degrees in the direction of the arrow D. Due to the turn the needle 24a of the electronic compass 24 has changed to show "270 degrees" direction. During the turn the receiver 22 of the radio-bearing device 20 has succeeded in making at least two signal strength measurements. This is indicated on the screen display 260 by highlighted areas 261 and 261a. Also there is indicated that in one direction, reference 262, the signal strength measurement has not succeeded. However, by reference 263 it is indicated that that a strong RSSI measurement result has been got during this turn period. Therefore, the RSSI indicator 22a shows quite a high reading.

Figure 4E:
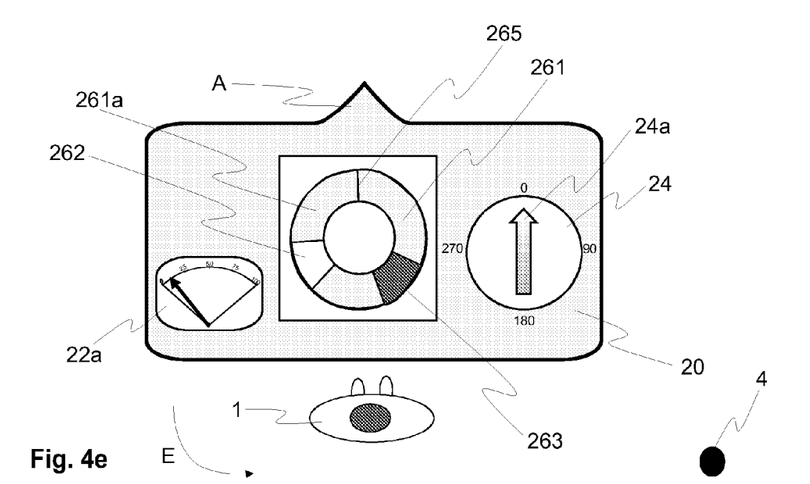

FIG. 4e depicts a situation after the radio-bearing device has been turned still further 90 degrees in the direction of the arrow E. Due to the turning the needle 24a of the electronic compass 24 has changed to show "0 degrees" direction. This means that the radio-bearing device 20 has been turned a full 360 degrees circle. During the turn the receiver 22 of the radio-bearing device 20 has succeeded in making several signal strength measurements in two portions 261 and 261a of the screen display 260. This is indicated on the screen display 260 by highlighted areas 261 and 261a. Also there is indicated that in one direction, reference 262, the signal strength measurement has not succeeded. By reference 263 is indicated the geographic direction wherefrom a maximum signal strength measurement result has been got.

By an optional line 265 may be indicated the starting direction of the tracking process.

Figure 4F:
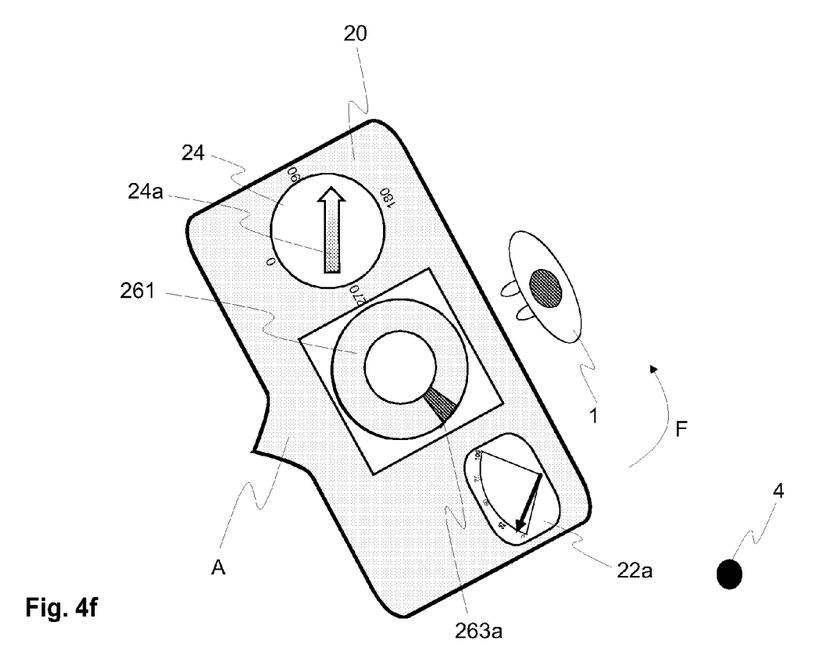
Figure 4G:
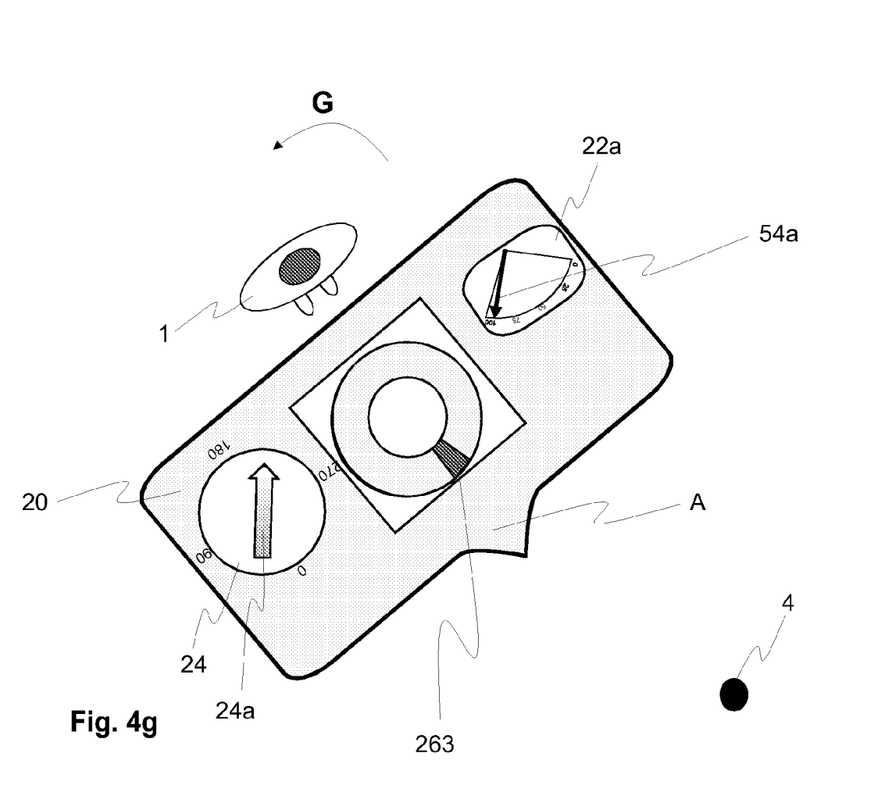

FIGS. 4f and 4g depict a situation where the tracker 1 wants to focus the measurement result of FIG. 4e. However, the depicted steps depicted in FIGS. 4f and 4g are only optional.

In FIG. 4e it was shown that a signal strength measurement was not successful in one direction. This was indicated in FIG. 4e on the screen display 260 by the portion 262. For correcting this deficiency the tracker 1 can turn the radio-bearing 20 device to the direction of the unsuccessful measurement result. In the example of FIG. 4f the radio-bearing device 20 is turned about 120 degrees counter-clockwise in the direction of arrow F. The electronic compass 24 has changed to show "120 degrees" direction. When a measurement result is got also from direction 262, which is indicated by removing the portion 262 from the screen display 260, the direction of the maximum signal strength 265 in FIG. 4f can be made narrower than the corresponding direction in FIG. 4e.

FIG. 4g depicts a situation where the tracker 1 has turned so that the maximum measured signal strength is straight in front of the tracker 1. By turning the tracker 1 has also turned the radio-bearing device 20 so that the indicated direction 263 of the target 2 is in front of the tracker 1. Therefore, also the RSSI indicator 22a shows a very high reading 54a.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method comprising:
   turn of a radio-bearing device in the horizontal plane;
   determining after a turn an angle of magnitude of the turn and a geographic direction of the radio-bearing device;
   determining if a signal has been received from the determined geographic direction;
   determining the received signal strength;
   saving the received signal strength with the determined geographic direction;
   determining a maximum received signal strength from all measured signals strengths; and
   showing the determined geographic directions and a geographic direction of the maximum received signal strength on a display of the radio-bearing device in their true directions.

2. The method according to claim 1, wherein the geographic direction of the radio-bearing device is determined by utilizing an electronic compass.

3. The method according to claim 2, wherein received signal strengths are determined from each determined geographic direction by utilizing a received signal strength detector.

4. The method according to claim 3, wherein after a turn of the radio-bearing device all determined geographic directions are shown on the display according to their actual geographic directions.

5. The method according to claim 4, wherein the direction wherefrom the maximum received signal strength measurement has been got is highlighted on the display of the radio-bearing device.

6. The method according to claim 5, wherein the radio-bearing device is utilized for tracking a dog.

7. An apparatus comprising:
a receiver with a signal strength detector;
an electronic compass configured to determine and indicate a geographic direction;
a display unit;
a processor; and
a memory including a computer program code;
the memory and the computer program code configured to, with the processor, cause the apparatus at least to:
determine a direction and an angle of magnitude of a turn and a geographic direction of the apparatus in the horizontal plane;
determine a signal strength received from the determined geographic direction;
save the determined signal strength with the determined geographic direction;
determine a maximum received signal strength from all received signal strengths; and
show the determined geographic directions and a geographic direction of the maximum received signal strength on the display of the apparatus in their true directions.

8. The apparatus according to claim 7, wherein the direction and the magnitude of the angle of the turn and the geographic direction of the apparatus after the turn are configured to be determined by the electronic compass.

9. The apparatus according to claim 8, which is configured to show on the display in their actual geographic directions all geographic directions which have been determined by the electronic compass.

10. The apparatus according to claim 9, wherein the determined geographic directions are configured to be turned on the display to an opposite direction than the determined direction of the turn of the apparatus.

11. The apparatus according to claim 10, wherein the geographic directions on the display are configured to be turned an equal magnitude of the angle as the apparatus has been turned between two consecutive compass readings.

12. The apparatus according to claim 11, where in the apparatus is a tracking device of a dog.

13. The apparatus according to claim 11, where in the display is an LCD, an OLEO or a LED display.

14. A direction determination circuitry configured to:
determine a turn in the horizontal plane;
determine a direction and an angle of magnitude of the turn;
determine and indicate after the turn a geographic direction;
determine a signal strength received from the indicated geographic direction;
save the determined signal strength measurement with the indicated geographic direction;
determine a maximum received signal strength from all determined signal strength measurements; and
show the determined geographic directions and highlight a geographic direction of the maximum determined signal strength on a display in their true directions.

15. The direction determination circuitry according to claim 14, wherein the geographic direction and the magnitude of the angle of the turning is configured to be determined from an output of an electronic compass.

16. The direction determination circuitry according to claim 15, which is configured to show on a display of an apparatus all determined geographic directions in their actual geographic directions.

17. The direction determination circuitry according to claim 16, which is configured to turn the determined geographic directions on the display to an opposite direction than the determined direction of the turn of the apparatus.

18. The direction determination circuitry according to claim 17, which is configured to turn the determined geographic directions on the display by an equal magnitude of the angle as the apparatus has been turned between two consecutive compass readings.

19. A tracking system comprising:
transmitter carried by an object to be tracked; and
a directional receiver comprising:
a means for determining and indicating a geographic direction;
a means for determining a received signal strength;
a means for saving the received signal strength with the determined geographic location;
a means for showing all geographic directions wherefrom signals have been determined; and
a means for showing the determined geographic directions and highlight a geographic direction of a maximum received signal strength on a display of the directional receiver in their true directions.

20. The tracking system according to claim 19, wherein the means for determining and indicating a geographic direction comprises an electronic compass.

21. The tracking system according to claim 19, wherein the means for showing all geographic directions are configured to show all determined geographic directions in their actual geographic directions on the display of the directional receiver.

22. A non-transitory computer readable storage medium having computer-executable components comprising:
computer readable code for determining a direction and an angle of magnitude of the turn of an apparatus in the horizontal plane;
computer readable code for determining after the turn a geographic direction of the apparatus;
computer readable code for determining a signal strength received from the determined geographic direction;
computer readable code for saving the received signal strength and determined geographic direction;
computer readable code for determining a maximum received signal strength from all received signals; and
computer readable code for showing the determined geographic directions and a geographic direction of the maximum received signal strength on a display of an apparatus in their true directions.

23. The computer readable storage medium according to claim 22, which further comprises:
computer readable code for turning the determined geographic directions on the display of the apparatus to an opposite direction than the determined direction of the turning of the apparatus; and
computer readable code for turning the determined geographic directions on the display by an equal magnitude of the angle as the apparatus has been turned between two consecutive compass readings.

* * * * *